United States Patent [19]

McCready

[11] Patent Number: 4,912,144

[45] Date of Patent: Mar. 27, 1990

[54] DUCTILE, BLOW-MOLDABLE COMPOSITION CONTAINING A STYRENE-METHYLMETHACRYLATE COPOLYMER HAVING PENDANT CARBOXY ESTER GROUPS

[75] Inventor: Russell J. McCready, Downingtown, Pa.

[73] Assignee: Arco Chemical Technology, Inc., Wilmington, Del.

[21] Appl. No.: 255,686

[22] Filed: Oct. 11, 1988

[51] Int. Cl.$^4$ .................................................. C08K 3/40
[52] U.S. Cl. ..................................... 523/522; 523/526; 525/176; 525/177; 525/242; 524/504; 524/505; 524/513
[58] Field of Search .................. 525/176, 177, 242; 524/504, 505, 513; 523/522, 526

[56] References Cited

U.S. PATENT DOCUMENTS

| | | | |
|---|---|---|---|
| 3,644,574 | 2/1972 | Jackson et al. | 525/177 |
| 3,786,116 | 1/1974 | Milkovich et al. | 525/276 |
| 4,034,013 | 7/1977 | Lane | 524/513 |
| 4,080,354 | 3/1978 | Kramer | 523/522 |
| 4,096,202 | 6/1978 | Farnham et al. | 525/64 |
| 4,180,489 | 12/3197 | Andrew et al. | 428/402 |
| 4,217,427 | 5/1980 | Falk et al. | 525/176 |
| 4,292,233 | 9/1981 | Binsack et al. | 524/494 |
| 4,659,765 | 4/1987 | Liu et al. | 524/447 |

FOREIGN PATENT DOCUMENTS

| | | |
|---|---|---|
| 0257691 | 3/1988 | European Pat. Off. . |
| 0257692 | 3/1988 | European Pat. Off. . |
| 0257693 | 3/1988 | European Pat. Off. . |

*Primary Examiner*—John Kight
*Assistant Examiner*—Sam A. Acquah
*Attorney, Agent, or Firm*—Dennis M. Kozak

[57] ABSTRACT

Moldable blends of rubber modified styrene/maleic anhydride copolymer, core-shell graft copolymer modified polybutylene terephthalate ester, and styrene-methylmethacrylate copolymer having pendant carboxy ester groups are provided. The compositions of this invention exhibit co-continuous resin phases and facilitate the production of blow molded articles which exhibit ductility.

35 Claims, No Drawings

DUCTILE, BLOW-MOLDABLE COMPOSITION CONTAINING A STYRENE-METHYLMETHACRYLATE COPOLYMER HAVING PENDANT CARBOXY ESTER GROUPS

This application is related to U.S. patent application (Attorney's Docket No. PF 50-01-2014A), filed of even date, entitled "Ductile, Blow Moldable Composition Containing a Styrene-Maleimide Copolymer Bearing Pendant Carboxyl or Hydroxyl Groups."

This invention relates to improved molding compositions.

In one of its more specific aspects, this invention relates to molding compositions containing a rubber modified styrenemaleic anhydride copolymer, a core-shell graft copolymer rubber modified polybutylene terephthalate ester, and a minor amount of a styrene-methylmethacrylate copolymer having pendant carboxy ester groups. Molding compositions of this invention exhibit cocontinuous phases, ductility upon molding, and can be blow molded.

Polymer blends of styrene-maleic anhydride copolymers (S/MA) and polybutylene terephthalate esters (PBT) are known from U.S. Pat. No. 3,644,574. Also known is a polymer mixture of PBT and a rubber modified styrene-maleic anhydride copolymer for use as an adhesive for laminates. This polymer mixture is described in EPA Publication No. 0 257 693. Molding compounds and films made from the polymer mixture are further described in EPA Publication Nos. 0 257 691 and 0 257 692, respectively.

U.S. Pat. No. 4,080,354 describes compositions of PBT with a second resinous component containing 1 to 40% vinyl aromatic units with the balance being non-aromatic units.

U.S. Pat. No. 4,217,427 describes PBT having incorporated thereinto pendant side chains of polystyrene to enhance its melt flow characteristics.

U.S. Pat. No. 4,659,765 describes elastomeric compositions containing a polybutylene terephthalate ester and a modifier resin. The modifier resin preferred is a core-shell graft copolymer.

Notwithstanding the general knowledge that blends of S/MA and PBT are useful compositions, it is well known that their combination, using melt mixing in an extruder, results in molded products which are brittle and tend to delaminate due to the gross immiscibility of the polymers. This tendency toward delamination has led the molding industry to continue to seek ways to combine these polymers attempting to obtain a composition which exhibits the high heat distortion temperature of the S/MA, the excellent solvent resistance of the PBT, and resistance to delamination. A composition having the above-mentioned combination of properties and ductility in molded form is also desired by the molding industry.

Co-pending U.S. Application Ser. No. 07/244,963 filed Sept. 15, 1988, discloses compositions of S/MA and PBT in which the S/MA and PBT phases are co-continuous. The co-continuous phases are achieved by incorporating a minor amount of a styrene-methylmethacrylate copolymer having pendant carboxy ester groups into a blend of S/MA and PBT. The molded products prepared from these compositions exhibit excellent deflection temperature under load, flexural modulus, unnotched impact strength, solvent resistance, and resistance to delamination, but they are brittle. U.S. Application Ser. No. 07/244,963 is incorporated herein in its entirety by reference.

The present invention is an improvement to the compositions of U.S. Application Ser. No. 07/244,963 and provides molded products which possess ductility. For reasons not clearly understood, it has been found that the attainment of molded articles which are ductile requires that both of the major components of the composition, that is, the S/MA and the PBT must be impact modified. The impact modification of only one of the S/MA or PBT components does not provide a composition which exhibits ductility in molded form. Moreover, ductility is not achieved in the absence of the styrene-methylmethacrylate copolymer bearing pendant groups even if both major resin components are impact modified.

According to this invention, there is provided a molded composition which exhibits ductility comprising:

(a) a rubber modified styrene-maleic anhydride copolymer;

(b) a core-shell graft copolymer rubber modified polybutylene terephthalate ester; and (c) a styrene-methylmethacrylate copolymer having pendant carboxy ester groups, wherein the weight ratio of copolymer (a) to polyester (b) is from about 35:65 to about 65:35, and the amount of copolymer (c) in parts by weight is from about 1 to about 20 per each 100 total parts by weight of (a)+(b)+(c).

Also according to this invention, there is provided a method of producing a moldable composition which comprises blending a rubber modified styrene-maleic anhydride copolymer, a core-shell graft copolymer rubber modified polybutylene terephthalate ester, and a minor amount of a stryene-methylmethacrylate copolymer having pendant carboxy ester groups.

Molded products prepared from the above-described moldable compositions are also provided by this invention. A particularly unique feature of the moldable compositions of this invention is that they can be blow molded into articles which are ductile rather than brittle.

In a preferred embodiment of the invention, the weight ratio of rubber modified S/MA copolymer to rubber modified PBT is within the range of from about 60:40 to about 40:60, and the composition exhibits co-continuous S/MA and PBT phases.

The term "co-continuous" means that upon blending both the S/MA and the PBT are present as continuous phases, that is, neither polymer is identifiable as a dispersed phase in a continuous phase of the other polymer. The term is intended to include the transition area between separate dispersed phases and two continuous phases, which transition area is observed with the more narrow weight ratio of S/MA to PBT of from about 65:35 to about 60:40 and from about 35:65 to about 40:60.

Any suitable rubber modified styrene-maleic anhydride copolymer can be used. Preferably, the rubber modified S/MA copolymer will contain in weight percent from about 1 to about 25 maleic anhydride from about 56 to about 94 styrene and from about 3 to about 30 rubber, which is incorporated during the polymerization of the styrene and maleic anhydride monomers. The rubber of the S/MA copolymer remains finely dispersed in the S/MA phase of the composition. The number average molecular weight of the S/MA copolymer will be within the range of from about 50,000 to about 300,000. Suitable S/MA copolymers are available from ARCO Chemical Company under the trademarks DYLARK 350, DYLARK 250, and DYLARK 700.

DYLARK ® 350 resin is rubber modified styrene-maleic anhydride copolymer containing in weight percent about 66 styrene, about 14 maleic anhydride, and about 20 rubber.

DYLARK ® 250 resin is a rubber modified styrene-maleic anhydride copolymer containing in weight percent about 77 styrene, about 8 maleic anhydride, and about 15 rubber.

DYLARK ® 700 resin is a rubber modified styrene-maleic anhydride copolymer containing in weight percent about 61 sytrne, about 14 maleic anhydride, and about 25 rubber.

The molding compositions of this invention will contain rubber modified S/MA copolymer in an amount within the range of from about 65 to about 35 weight percent, preferably from about 60 to about 40 weight percent, based on the total weight of the S/MA and PBT. Within these weight percent ranges, and in the presence of a minor amount of a styrene-methylmethacrylate copolymer bearing pendant carboxy ester groups, the compositions exhibit co-continuous phases.

Any suitable PBT resin can be used. They are typically prepared by the condensation reaction of 1,4-butanediol and terephthalic acid. The PBT is typically impact modified by precompounding the PBT with the selected core-shell graft copolymer using any suitable method of combination which will typically include the use of conventionally employed additives such as antioxidants and the like. The weight ratio of core-shell copolymer to PBT will be from about 5:95 to about 35:65, preferably 7.5:92.5 to about 40:60. The core-shell graft copolymer rubber remains substantially finely dispersed in the PBT phase of the composition.

Specific examples of suitable core-shell graft copolymers and the production thereof are disclosed in U.S. Pat. Nos. 4,180,494; 4,034,013; 4,096,202; 3,808,180; and 4,292,233, all teachings of which are incorporated herein by reference.

Core-shell graft copolymers suitable for use in the practice of this invention are commercially available from Rohm & Haas Chemical Company and include KM-653 and KM-611 butadiene-based core-shell copolymers and KM-330 acrylate-based core-shell copolymer. KM-653 core-shell copolymer is preferred.

The compositions of this invention will contain the modified PBT in an amount within the range of from about 35 to about 65 weight percent, preferably from about 40 to about 60 weight percent, based on the total weight of the rubber modified S/MA and the modified PBT.

The styrene-methylmethacrylate copolymer containing pendant carboxy ester groups can be prepared using conventional free radical solution or suspension polymerization techniques. Suitable copolymers will have number average molecular weights within the range of from about 50,000 to about 100,000 and will contain from about 1 to about 30 weight percent methylmethacrylate, preferably about 15 to about 25 weight percent methylmethacrylate. Most preferred is a copolymer containing about 20 weight percent methylmethacrylate. Examples 1 and 2 of U.S. Application Ser. No. 07/244,963 describe the preparation of styrene-methylmethacrylate copolymers suitable for use in this invention and are repeated as Examples 1 and 2 herein. Suitable styrene-methylmethacrylate copolymers having pendant carboxy ester groups are also available commercially from Richardson Polymer Corporation under the designation P-359 acrylic copolymer.

The styrene-methylmethacrylate copolymer containing pendant carboxy ester groups will be employed in an amount of from about 1 to about 20 parts by weight, preferably from about 8 to about 12 parts by weight, for each 100 parts by weight of total rubber modified S/MA, modified PBT, and styrene-methylmethacrylate copolymer. The styrene-methylmethacrylate copolymer functions as an interfacial modifier between the S/MA and PBT phases.

The following examples will serve to further demonstrate the invention.

EXAMPLE 1

This example is Example 1 of U.S. Ser. No. 07/244,963 and demonstrates the preparation of a styrene-methylmethacrylate copolymer containing 16% by weight methylmethacrylate and having pendant carboxy ester groups suitable for use in the practice of this invention.

Styrene (200 parts) and methylmethacrylate (38 parts, 16% by weight to total monomer charged) were suspended in 360 mls. dionized water containing 0.3 part 2,2'-azobis(isobutyronitrile) free radical initiator (available commercially under the designation VAZO 64 from DuPont Company), 0.6 part sodium sulfate, and 2 parts tricalcium phosphate suspension agent. The reactor was heated to 80° C. for about 4 hours. At the conclusion of polymerization, the resultant copolymer was isolated by suction filtration, washed with dilute acid and water, and finally dried. The copolymer had Tg 102° C.

EXAMPLE 2

This example is Example 2 of U.S Ser. No. 07/244,963 and demonstrates the preparation of a styrene-maleimide copolymer containing 22% by weight methylmethacrylate and having pendant carboxy ester groups suitable for use in the practice of this invention.

Styrene (200 parts) and methylmethacrylate (56.4 parts, 22% by weight to total monomer charged) were suspended in 360 mls. dionized water containing 0.3 part 2,2'-azobis(isobutyronitrile) free radical initiator (available commercially under the designation VAZO 64 from DuPont Company), 0.6 part sodium sulfate, and 2 parts tricalcium phosphate suspension agent. The reactor was heated to 80° C. for about 5 hours. At the conclusion of polymerization, the resultant copolymer was isolated by suction filtration, washed with dilute acid and water, and finally dried. The copolymer had Tg 99° C.

EXAMPLE 3

This example demonstrates the preparation of a core-shell graft copolymer modified PBT suitable for use in the practice of this invention.

About 300 parts of a KM-653 acrylic core-shell rubber (Rohm & Haas Company) and about 700 parts of PBT were pre-compounded on a Sterling extruder (1 inch, 36:1 L/D) at 500° F. profile. After extrusion, the compound was pelletized and dried at about 200° F.

EXAMPLE 4

This example demonstrates the preparation of a ductile molded composition of this invention.

A mixture of 45 parts by weight of rubber modified styrene-maleic anhydride copolymer (DYLARK® 350 resin, ARCO Chemical Company), 45 parts by weight of the core-shell copolymer modified PBT prepared in Example 3, and 10 parts by weight of the styrene-methylmethacrylate copolymer bearing pendant carboxy ester groups designated P-359, commercially available from Richardson Company, were extruded at 480° F. profile and pelletized. The pellets were molded into ASTM test samples on a Battenfeld injection molding machine at 465° F. profile and 140° F. mold temperature.

The physical properties of the resulting molded composition of the invention is compared to three control samples in following Table I.

TABLE I

PHYSICAL PROPERTIES OF A MOLDED COMPOSITION OF THE INVENTION (EXAMPLE 4)

| Example No. | Control | Control | Control | 4 |
|---|---|---|---|---|
| Materials (Parts by Weight) | | | | |
| Rubber Modified S/Ma (DYLARK 350) | 100 | 0 | 45 | 45 |
| Rubber Modified PBT of Ex. 3 | 0 | 100 | 55 | 45 |
| S/MMA Copolymer bearing pendant carboxy ester groups[1] | 0 | 0 | 0 | 10 |
| Physical Property | | | | |
| Flex. Modulus ($\times 10^3$, psi)[2] | 366 | 220 | 261 | 289 |
| Tensile Strength (psi)[3] | 4700 | 4400 | 5700 | 5480 |
| Tensile Elongation (%)[3] | 15 | 100 | 21 | 27 |
| Notched Izod (ft-lbs/in)[4] | 2.7 | 10 | 1.2 | 1.7 |
| Unnotched Izod (ft-lbs/in)[4] | — | NB[7] | 15 | 16 |
| Deflection Temp. under Load (°F., 254 psi)[5] | 207 | 136 | 184 | 157 |
| Gardner Falling Weight Index (in-lbs)[6] | <80 | <80 | <80 | >320 |
| Type of Failure | Brittle | Brittle | Brittle | Ductile |

[1]P-359 Richardson Company
[2]ASTM D-790
[3]ASTM D-638
[4]ASTM D-256
[5]ASTM D-648
[6]1¼" diameter orifice; 8 lb. ½" diameter dart
[7]NB = no break The physical property data in Table I demonstrate that a molded composition of this invention in which both the S/MA and the PBT are impact modified and a minor amount of a styrene-methylmethacrylate copolymer bearing pendant groups is incorporated achieves the beneficial combination of component physical properties and ductility as compared to the three control experiments.

EXAMPLE 5

The moldable composition of Example 4 is blow molded on an Impco B13 blow molding machine into a 10-inch long hourglass-shaped article having a major diameter of about 4 inches. The following approximate blow molding conditions are used:

| Rear Zone Temp. (°F.) | 420–440 |
|---|---|
| Front Zone Temp. (°F.) | 410–430 |
| Die Head Temp. (°F.) | 420–460 |
| Blow Time (sec.) | 20–60 |
| Exhaust (sec.) | 1–5 |
| Parison Drop Time (sec.) | 1–3 |
| Blow Pressure (psi) | 40–80 |

It will be evident from the foregoing that various modifications can be made to this invention. Such, however, are considered as being within the scope of the invention.

What is claimed is:

1. A moldable composition which exhibits ductility upon molding comprising:
   (a) a rubber modified styrene-maleic anhydride copolymer;
   (b) a core-shell graft copolymer modified polybutylene terephthalate ester; and
   (c) a styrene-methylmethacrylate copolymer having pendant carboxy ester groups, wherein the weight ratio of copolymer (a) to polyester (b) is from about 65:35 to about 35:65, and the amount of copolymer (c) in parts by weight is from about 1 to about 20 parts per each 100 parts by weight of total (a)+(b)+(c).

2. The composition of claim 1 in which said rubber modified styrene-maleic anhydride copolymer contains from about 1 to about 25 weight percent maleic anhydride.

3. The composition of claim 1 in which said rubber modified styrene-maleic anhydride copolymer contains from about 3 to about 30 weight percent rubber.

4. The composition of claim 1 in which said rubber modified styrene-maleic anhydride copolymer contains from about 56 to about 94 weight percent styrene.

5. The composition of claim 1 in which said weight ratio of copolymer (a) to polyester (b) is from about 60:40 to about 40:60.

6. The composition of claim 1 in which said amount of copolymer (c) in parts by weight is from about 8 to about 12 per each 100 parts by weight of total (a)+(b)+(c).

7. The composition of claim 1 in which said copolymer (c) contains in weight percent from about 1 to about 30 methylmethacrylate with the balance being styrene.

8. The composition of claim 1 in which said polybutylene terephthalate ester contains in weight percent from about 5 to about 35 core-shell graft copolymer with the balance being polybutylene terephthalate ester.

9. The composition of claim 1 in which said core-shell graft copolymer is a butadiene-based core-shell graft copolymer.

10. The composition of claim 1 in which said core-shell graft copolymer is an acrylate-based core-shell copolymer rubber.

11. A moldable composition which exhibits ductility upon molding comprising:
   (a) a rubber modified styrene-maleic anhydride copolymer having a number average molecular weight within the range of from about 50,000 to about 300,000;
   (b) a core-shell copolymer modified polybutylene terephthalate ester; and
   (c) a styrene-methylmethacrylate copolymer having pendant carboxy ester groups, wherein the weight ratio of copolymer (a) to polyester (b) is from about 65:35 to about 35:65, and the amount of copolymer (c) in parts by weight is from about 8 to about 12 parts per each 100 parts by weight of total (a)+(b)+(c), and wherein copolymer (a) and polyester (b) are present in the composition as co-continuous phases.

12. The composition of claim 11 in which said weight ratio of copolymer (a) to polyester (b) is from about 60:40 to about 40:60.

13. A method of producing a moldable composition which comprises blending:
(a) a rubber modified styrene-maleic anhydride copolymer:
(b) a core-shell graft copolymer modified polybutylene terephthalate ester; and
(c) a styrene-methylmethacrylate copolymer having pendant carboxy ester groups, wherein the weight ratio of copolymer (a) to polyester (b) is from about 65:35 to about 35:65, and the amount of copolymer (c) in parts by weight is from about 1 to about 20 parts per each 100 parts of total (a)+(b)+(c).

14. A molded article produced by molding a composition comprising:
(a) a rubber modified styrene-maleic anhydride copolymer;
(b) a core-shell graft copolymer modified polybutylene terephthalate ester; and
(c) a styrene-methylmethacrylate copolymer having pendant carboxy ester groups, wherein the weight ratio of copolymer (a) to polyester (b) is from about 65:35 to about 35:65, and the amount of copolymer (c) in parts by weight is from about 1 to about 20 parts per each 100 parts of total (a)+(b)+(c).

15. The molded article of claim 14 being a blow molded article produced by blow molding said composition.

16. The composition of claim 14 in which said rubber modified styrene-maleic anhydride copolymer contains from about 1 to about 25 weight percent maleic anhydride.

17. The composition of claim 14 in which said rubber modified styrene-maleic anhydride copolymer contains from about 3 to about 30 weight percent rubber.

18. The composition of claim 14 in which said rubber modified styrene-maleic anhydride copolymer contains from about 56 to about 94 weight percent styrene.

19. The composition of claim 14 in which said weight ratio of copolymer (a) to polyester (b) is from about 60:40 to about 40:60.

20. The composition of claim 14 in which said amount of copolymer (c) in parts by weight is from about 8 to about 12 per each 100 parts by weight of total (a)+(b)+(c).

21. The composition of claim 14 in which said copolymer (c) contains in weight percent from about 1 to about 30 methylmethacrylate with the balance being styrene.

22. A molded article produced by molding a composition having two co-continuous phases comprising:
(a) a rubber modified styrene-maleic anhydride copolymer having a number average molecular weight within the range of from about 50,000 to about 300,000;
(b) a core-shell graft copolymer modified polybutylene terephthalate ester; and
(c) a styrene-methylmethacrylate copolymer having pendant carboxy ester groups, wherein the weight ratio of copolymer (a) to polyester (b) is from about 65:35 to about 35:65, and the amount of copolymer (c) in parts by weight is from about 8 to about 12 parts per each 100 parts by weight of total (a)+(b)+(c), and wherein copolymer (a) and polyester (b) are present in the composition as co-continuous phases.

23. The molded article of claim 22 in which said weight ratio of copolymer (a) to polyester (b) is from about 60:40 to about 40:60.

24. The article of claim 22 being a blow molded article produced by blow molding said composition.

25. A ductile molded composition comprising a first continuous phase, a second continuous phase, and an interface, wherein the first continuous phase comprises a rubber modified styrene-maleic anhydride copolymer, the second continuous phase comprises core-shell graft copolymer modified polybutylene terephthalate, and the interface comprises a styrene-methylmethacrylate copolymer having pendant carboxy ester groups.

26. The molded composition of claim 25 in which the weight ratio of styrene-maleic anhydride copolymer to polybutylene terephthalate is from about 65:35 to about 35:65.

27. The molded composition of claim 25 in which the weight ratio of styrene-maleic anhydride copolymer to polybutylene terephthalate is from about 60:40 to about 40:60.

28. The molded composition of claim 25 in which said styrene-methylmethacrylate copolymer is present in an amount of from about 1 to about 20 parts by weight per each 100 parts by weight of the total composition, including the styrene-methylmethacrylate copolymer.

29. The molded composition of claim 25 in which said styrene-maleic anhydride copolymer has a number average molecular weight within the range of from about 50,000 to about 300,000 and contains from about 1 to about 25 weight percent maleic anhydride.

30. The molded composition of claim 25 in which said polybutylene terephthalate ester contains in weight percent from about 5 to about 35 core-shell graft copolymer with the balance being polybutylene terephthalate ester.

31. The composition of claim 25 in which said core-shell graft copolymer is a butadiene-based core-shell graft copolymer.

32. The composition of claim 25 in which said core-shell graft copolymer is an acrylate-based core-shell copolymer rubber.

33. The composition of claim 25 in which said styrene-methylmethacrylate copolymer contains from about 1 to about 30 weight percent methylmethacrylate.

34. A ductile molded composition comprising a first continuous phase, a second continuous phase, and an interface wherein
(a) said first continuous phase is a rubber modified styrene maleic anhydride copolymer having a number average molecular weight within the range of from about 50,000 to about 300,000 and contains in weight percent from about 56 to about 94 styrene, from about 1 to about 25 maleic anhydride, and from about 3 to about 30 rubber,
(b) said second continuous phase is an acrylate-based core-shell graft copolymer modified polybutylene terephthalate containing in weight percent from about 65 to about 35 polybutylene terephthalate and from about 35 to about 65 of a core-shell graft copolymer,
(c) said interface is comprised of a styrene-methylmethacrylate copolymer bearing pendant carboxy ester groups, and containing in weight percent from about 1 to about 30 methylmethacrylate and from about 99 to about 70 styrene, wherein the weight ratio of the rubber modified styrene maleic anhydride copolymer to core-shell graft copolymer modified polybutylene terephthalate is from about 35:65 to about 65:35, and wherein the styrene-methylmethacrylate copolymer bearing pendant carboxy ester groups is employed in an amount of from about 1 to about 20 parts per each 100 parts of total composition, including the styrene-methylmethacrylate copolymer.

35. The ductile, molded composition of claim 34 in which said second continuous phase is a butadiene-based core-shell graft copolymer modified polybutylene terephthalate.

* * * * *